US011693912B2

(12) United States Patent
Zhu et al.

(10) Patent No.: US 11,693,912 B2
(45) Date of Patent: *Jul. 4, 2023

(54) ADAPTING DATABASE QUERIES FOR DATA VIRTUALIZATION OVER COMBINED DATABASE STORES

(71) Applicant: AVEVA SOFTWARE, LLC, Lake Forest, CA (US)

(72) Inventors: Jiping Zhu, Thornleigh (AU); Benjamin James Graham, Lane Cove (AU)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/186,636

(22) Filed: Feb. 26, 2021

(65) Prior Publication Data

US 2021/0256079 A1 Aug. 19, 2021

Related U.S. Application Data

(63) Continuation of application No. 15/797,901, filed on Oct. 30, 2017, now Pat. No. 10,970,343.

(60) Provisional application No. 62/417,467, filed on Nov. 4, 2016.

(51) Int. Cl.
| | |
|---|---|
| G06F 16/9535 | (2019.01) |
| G06F 16/2452 | (2019.01) |
| G06F 16/2453 | (2019.01) |
| G06F 16/2458 | (2019.01) |

(52) U.S. Cl.
CPC ...... *G06F 16/9535* (2019.01); *G06F 16/2452* (2019.01); *G06F 16/2453* (2019.01); *G06F 16/2458* (2019.01)

(58) Field of Classification Search
CPC ............ G06F 16/9535; G06F 16/2452; G06F 16/2453; G06F 16/2458
USPC ........................................................ 707/716
See application file for complete search history.

(56) References Cited

U.S. PATENT DOCUMENTS

| | | |
|---|---|---|
| 7,933,916 B2 | 4/2011 | Dolin et al. |
| 9,934,306 B2 | 4/2018 | Subramanian et al. |
| 2006/0122990 A1* | 6/2006 | Smith ................ G06F 16/9535 |
| 2014/0379753 A1 | 12/2014 | Roit et al. |
| 2017/0286455 A1 | 10/2017 | Li et al. |

* cited by examiner

*Primary Examiner* — Michael Pham
(74) *Attorney, Agent, or Firm* — Greenberg Traurig, LLP

(57) ABSTRACT

Adapting database queries from a common interface into conditions specific to database storage formats, optimization of a data model, and virtualization of query results from combined databases.

17 Claims, 11 Drawing Sheets

ADAPTING DATABASE QUERIES FOR DATA VIRTUALIZATION OVER COMBINED DATABASE STORES

CROSS-REFERENCE TO RELATED APPLICATIONS

This application is a continuation of U.S. patent application Ser. No. 15/797,901, filed Oct. 30, 2017, entitled "ADAPTING DATABASE QUERIES FOR DATA VIRTUALIZATION OVER COMBINED DATABASE STORES," which claims priority from U.S. Provisional Patent Application Ser. No. 62/417,467, filed Nov. 4, 2016, entitled "ADAPTING DATABASE QUERIES FOR DATA VIRTUALIZATION OVER COMBINED DATABASE STORES." The entire contents of the above-identified applications are expressly incorporated herein by reference, including the contents and teachings of any references contained therein.

TECHNICAL FIELD

Aspects of the present disclosure generally relate to the fields of networked computerized supervisory control and data acquisition (SCADA), industrial control, automation systems, and networked computerized systems utilized to monitor, log, and display relevant manufacturing/production events and associated data, and supervisory level control and manufacturing information systems. More particularly, aspects of the present disclosure relate to systems and methods for adapting database queries for data virtualization, which is an approach to data management that allows an application to retrieve and manipulate data without requiring technical details about the data, such as how it is formatted at the data source or where it is physically located.

BACKGROUND

In conventional computerized SCADA systems, the size of configuration data can be very large (e.g., greater than 100 GB) and the configuration data format is proprietary, fixed, and requires familiarity with the low-level storage implementation to read and write data outside the proprietary toolsets. Features such as sorting, filtering, and selecting of data from generic technologies cause computing resource (e.g., processor, memory, etc.) exhaustion and extremely slow response times, significantly impairing engineer productivity. In addition, merging data from data sources with different storage methods is extremely complicated, time-consuming, and unnecessarily utilizes computing memory and communications network resources. Conventional techniques cannot sort or filter data records in more than one database file at a time and require loading all data records into memory before sorting and filtering can occur.

SUMMARY

Aspects of the disclosure permit adaptation of programmatic queries from a common interface into conditions specific to different data storage formats, optimization of a data model, and virtualization of query results from combined database stores. In this manner, aspects of the disclosure provide data virtualization, which is an approach to data management that allows an application to retrieve and manipulate data without requiring technical details about the data, such as how it is formatted at the data source or where it is physically located.

In an aspect, a system includes a first computing device, a communications network, and a second computing device. The first computing device includes an interface processor and a memory device communicatively coupled to the interface processor. The memory device stores processor readable instructions that, when executed by the interface processor, provide a query-based programmatic interface and a proxy. The query-based programmatic interface is configured to receive database queries. The parser is configured to validate the received queries and produce entity query criteria from the validated queries. The second computing device is communicatively coupled to the first computing device via the communications network. The second computing device includes a query processor and a memory device communicatively coupled to the query processor. The memory device stores processor readable instructions that, when executed by the query processor, provide an entity query source. The entity query source is configured to adapt the entity query criteria into one or more conditions of a plurality of data sources such that the data sources filter and sort data stored therein to determine query results satisfying the database queries. The entity query source is further configured to return the query results for display via the query-based programmatic interface. In an aspect, the memory device of the second computing device stores processor readable instructions that, when executed by the query processor, further provide an executor. The executor is configured to receive the entity query criteria from the proxy via the communications network and invoke corresponding methods of the entity query source.

In another aspect, a computer-implemented method for querying data across combined data stores includes receiving a database query via a query-based programmatic interface. A parser validates the received query and produces entity query criteria from the validated query. An entity query source adapts the entity query criteria into conditions of a proprietary database format such that a database of the proprietary format filters and sorts data stored therein to determine query results satisfying the database query. The method also includes displaying the query results via the query-based programmatic interface.

In yet another aspect, a computer readable storage device stores processor readable instructions that, when executed by a processor, provide a database query platform. The platform includes a query-based programmatic interface configured to receive database queries. A parser comprising the platform is configured to validate the received queries and produce entity query criteria from the validated queries. The platform also includes an executor and an entity query source. The executor is configured to receive the entity query criteria from the parser and invoke one or more corresponding methods in the entity query source. The entity query source is configured to perform the corresponding methods to adapt the entity query criteria into one or more conditions of a plurality of data sources such that the data sources filter and sort data stored therein to determine query results satisfying the database queries represented by the entity query criteria. The entity query source is also configured to return the query results for display via the query-based programmatic interface.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
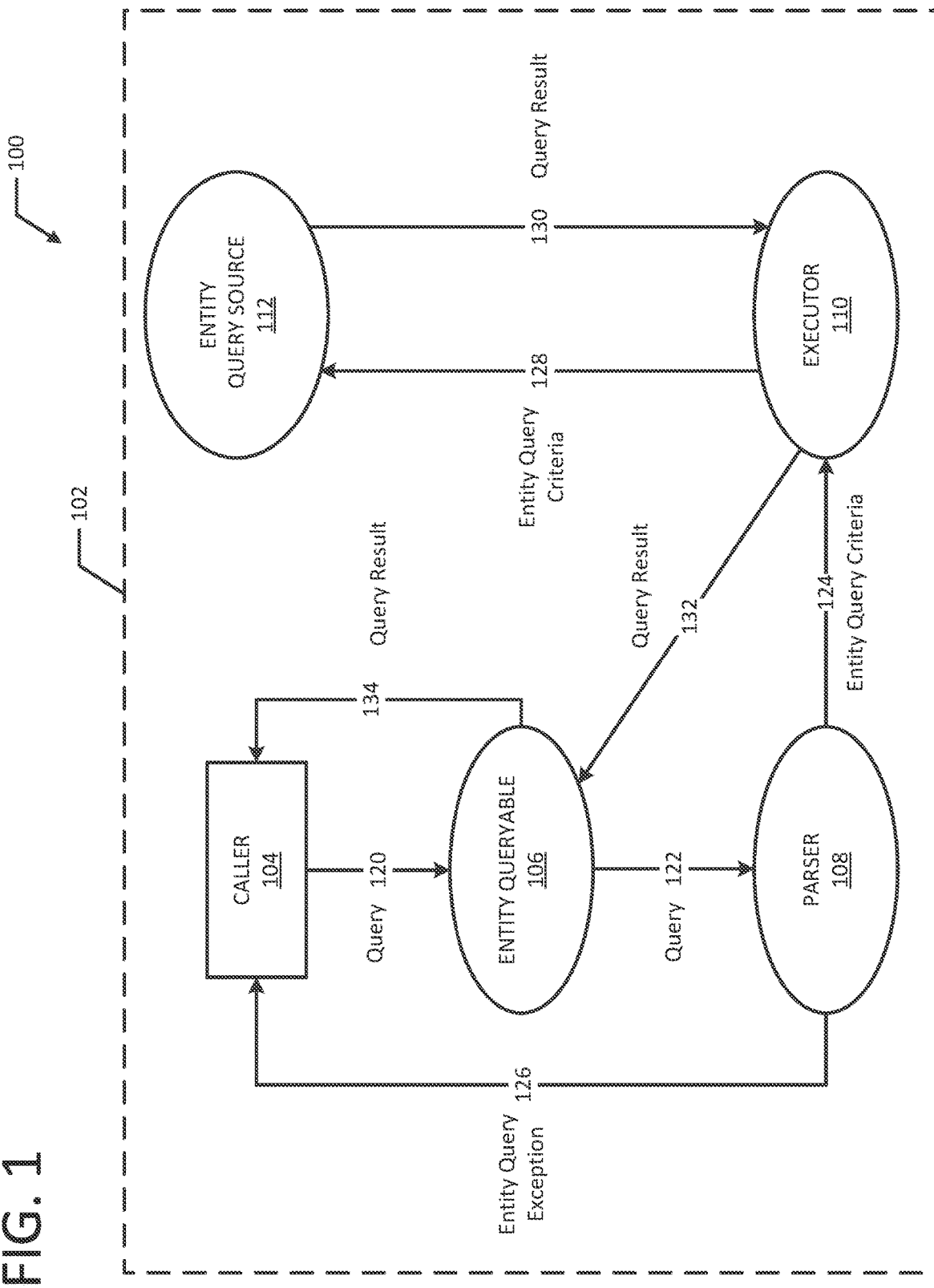
FIG. 1 illustrates an exemplary diagram of the structure of a local computing device system within which aspects of the disclosure may be implemented according to an embodiment.

FIG. 1 illustrates an exemplary local computing device system configured to perform a database query process, generally indicated at 100, within which an embodiment of the disclosure may be incorporated. In an aspect, the system and process described herein permit developers to focus on business logic (e.g., Citect user configuration, etc.) instead of the underlying data details while working with large user projects. For example, a developer may provide a command (e.g., "create queryable object", etc.) without needing to know the details behind the object creation. In another aspect, the system and process described herein adapt queries from a common interface into conditions specific to particular database formats so that a single query can act on multiple database stores. In yet a further aspect, the system and process described herein store values indicating the fields required for fulfilling the query to optimize memory usage by not having to load all the data in memory in order to execute the query. The system includes a computing device 102 that further includes a programmatic interface indicated at a caller 104, which can be embedded in a user interface and/or another programmatic interface. The system also includes a queryable interface that further includes an entity queryable 106, a parser 108, an executor 110, and an entity query source 112, which interacts with a query process engine (not shown).

The caller 104 is configured to receive one or more queries from a user and provide query results to the user via a display device (e.g., computing device monitor, mobile phone, smartphone, tablet, etc.) and/or via a programmatic output. The caller 104 provides, at 120, queries (e.g., raw Language-Integrated Query (LINQ) query statements, etc.) to an entity queryable 106, which in turn provides, at 122, the queries (e.g., raw query expression, etc.) to a parser 108.

The parser 108 in the queryable interface is configured to validate a query, such as a LINQ statement, received via caller 104, as further described herein. The criteria validation of the query is performed so that the expression parsed at a client computing device can be executed on a server computing device. In an embodiment, the validation requires the parsed lambda expression only contain methods and variables from the allowed types, as further defined herein. Exemplary methods and variables include, but are not limited to, instance methods from an entity and a field, static and instance methods from standard classes and generics defined in standard types in .NET assembly (e.g., short, integer, long, float, double, Boolean, string, etc.), and static methods defined in a System.Linq.Enumerable .NET class. The parser 108 is configured to recursively traverse through the expression tree and, when the validation fails to pass, return a specific type of exception containing the reason why the validation did not pass.

The parser 108 in the queryable interface is also configured to produce, at 124, an entity query criteria, which represents the key information in the parsed query. In an embodiment, the entity query criteria provides an indication of the fields required for fulfilling the query (e.g., referenced fields), functions that operate on an entity and return whether the entity satisfies the filter condition (e.g., filter predicates), information on the sort order (e.g., sort definitions), a field to select (e.g., selected fields), and a number of entities to skip and a number of entities to take (e.g., skip and take). The parser 108 is further configured to return, at 126, an entity query exception to caller 104 when parsing fails. In an embodiment, the entity query exception includes a reason for the exception and the statement that caused the exception.

The executor 110 invokes, at 128, corresponding methods under the entity query source 112, which is configured to adapt the entity query criteria into conditions for the particular format of databases, as further described herein. In an aspect, entity query source 112 implements a function that retrieves (e.g., via a get statement) all entities that satisfy a given entity query criteria. For example, in an embodiment entity query source 112 implements GetEntities(IQueryableCriteria) where IQueryableCriteria is an embodiment of the entity query criteria. In another aspect, entity query source 112 implements a function that gets field values of all entities that satisfy a given entity query criteria. For example, in an embodiment entity query source 112 implements GetFields(IQueryableCriteria) where IQueryableCriteria is an embodiment of the entity query criteria. In yet another aspect, entity query source 112 implements a function that gets the count of all entities that satisfy a given entity query criteria. For example, in an embodiment entity query source 112 implements GetCount(IQueryableCriteria) where IQueryableCriteria is an embodiment of the entity query criteria.

The entity query source 112 is further configured to receive requests from the queryable interface and translate the entity query criteria into a language/syntax that a specific storage understands. In an embodiment, entity query source 112 includes an adapter component configured to adapt statements (e.g., LINQ statements) of received queries into one or more conditions of data sources. The entity query source 112 is also configured to determine the optimized route of the storage in order to return the data in the most useful way. In an embodiment, entity query source 112 executes an optimization algorithm configured to optimize assignment of the received queries to the data sources. The entity query source 112 returns, at 130, the query result to the executor 110. Exemplary query results include, but are not limited to, a collection of entities (e.g., an IEntity array), a collection of fields (e.g., an IField array), and a count. In an embodiment, an entity is an object that contains one or more named fields and a field is an object that contains a value of generic type, usually named in an entity. In one or more embodiments, entity query source 112 includes one or more of a data modeling component configured to model the data stored in the data sources, an action details component configured to implement details for reading data from and writing data to the data sources, and a memory saving component configured to reduce utilization of computing memory of the system. The executor 110 provides, at 132, the query result to the entity queryable 106, which in turn provides, at 134, the query result to the caller 104 so that it can provide the query results to the user via the display device and/or via a programmatic output.

Figure 2:
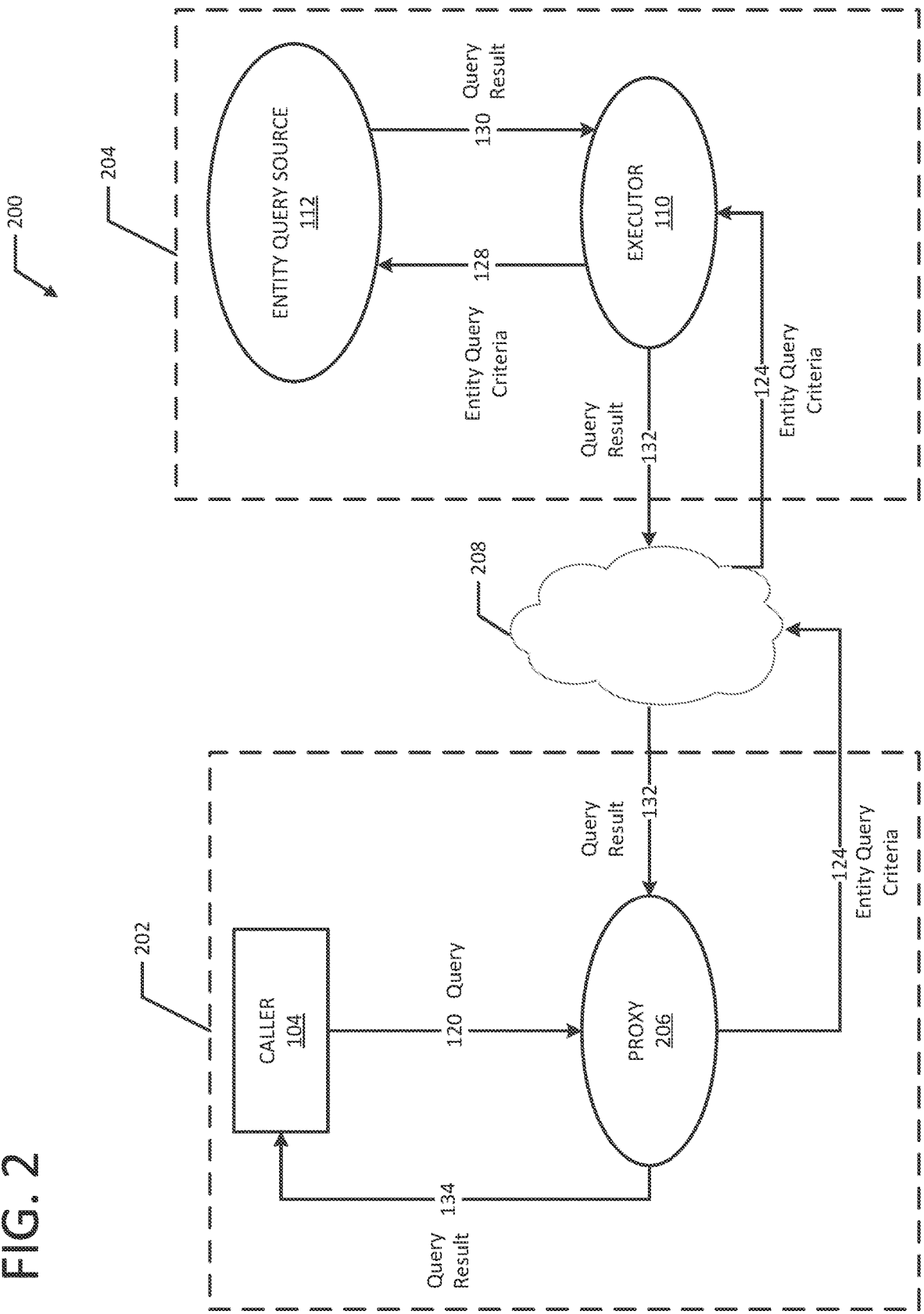
FIG. 2 illustrates an exemplary diagram of the structure of a system utilizing a client/server network architecture within which aspects of the disclosure may be implemented according to an embodiment.

FIG. 2 illustrates an exemplary system utilizing a client-server network architecture and configured to perform the database query process described above, generally indicated at 200. The system illustrated in FIG. 2 includes caller 104 and a proxy 206 on a first computing device 202, a communications network 208, and the executor 110 and entity query source 112 on a second computing device 204. In an embodiment, the proxy 206 includes entity queryable 106 and/or parser 108. In another embodiment, proxy 206 is a distinct component that performs functions substantially similar to entity queryable 106 and/or parser 108.

The system includes communications network 208 capable of facilitating the exchange of data among first computing device 202, second computing device 204, proxy 206, and/or executor 110. The communications network 208 may include a local area network (LAN) that is connectable to other telecommunications networks, including other LANs or portions of the Internet or an intranet. The communications network 208 may also be any telecommunications network that facilitates the exchange of data, such as those that operate according to the IEEE 802.3 (e.g., Ethernet) and/or the IEEE 802.11 (e.g., Wi-Fi) protocols, for example. In other embodiments, the communications network 208 is any medium that allows data to be physically transferred through serial or parallel communication channels (e.g., copper wire, optical fiber, computer bus, wireless communication channel, etc.). In an embodiment, the communications network 208 comprises at least in part a process control network. In another embodiment, the communications network 208 comprises at least in part a SCADA system.

Figure 3A:
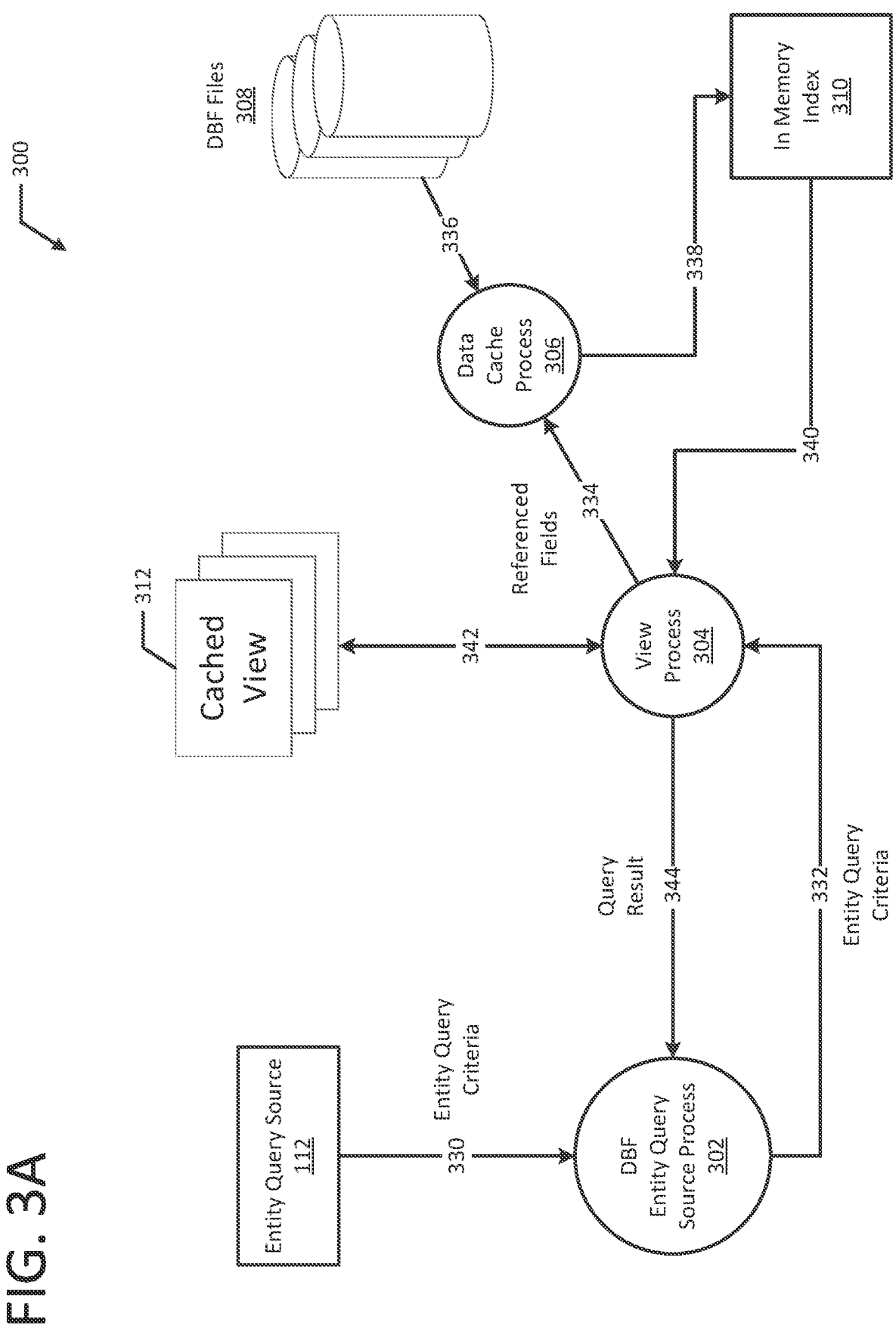
FIG. 3A illustrates an exemplary diagram of a query data source utilizing data storage in DBF database files according to an embodiment.

FIG. 3A illustrates an exemplary embodiment of a system and process utilizing database files (DBF) as the storage, generally indicated at 300. The system includes entity query source 112, a DBF entity query source process component 302, a view process component 304, a data cache process component 306, databases storing DBF files 308, an in-memory index 310, and a cached view 312. In the illustrated embodiment, entity query source 112 processes the requested entity query criteria by providing, at 330, the entity query criteria to the DBF entity query source process component 302, which provides, at 332, the entity query criteria to the view process component 304. The view process component 304 provides, at 334, the referenced fields to the data cache process component 306 for indexing DBF files 308.

In an embodiment, an indication of the fields required for fulfilling the query (e.g., referenced fields) within the entity query criteria informs, at 336, the data cache process component 306 to index, at 338, certain columns of DBF files 308 into in-memory index 310. The view process component 304 receives data from the in-memory index 310 at 340 and sorts and filters the received data using the filter predicates and sort definition from the entity query criteria. In the context of the embodiment of FIGS. 3A-3C, a view includes a graphical representation of data received from the in-memory index 310. The view process component 304 stores, at 342, the result in cached view 312, identified by the entity query criteria. The view process component 304 is configured to reuse the matching result of the entity query criteria when the result is available in cached view 312 in order to optimize for repeated query requests of the same conditions. The cached view 312 stores values indicating the fields required for fulfilling the query (e.g., referenced fields) to optimize the memory usage of the computing device. Once the view (i.e., sorted and filtered) is ready, view process component 304 extracts, at 342, the data from the view using skip and take information from entity query criteria, and then populates the fields indicated by selected fields in the entity query criteria. This subrange of populated data then becomes the query result of the user query, and is returned via entity query source 112 at 344, all the way to caller 104.

Figure 3B:
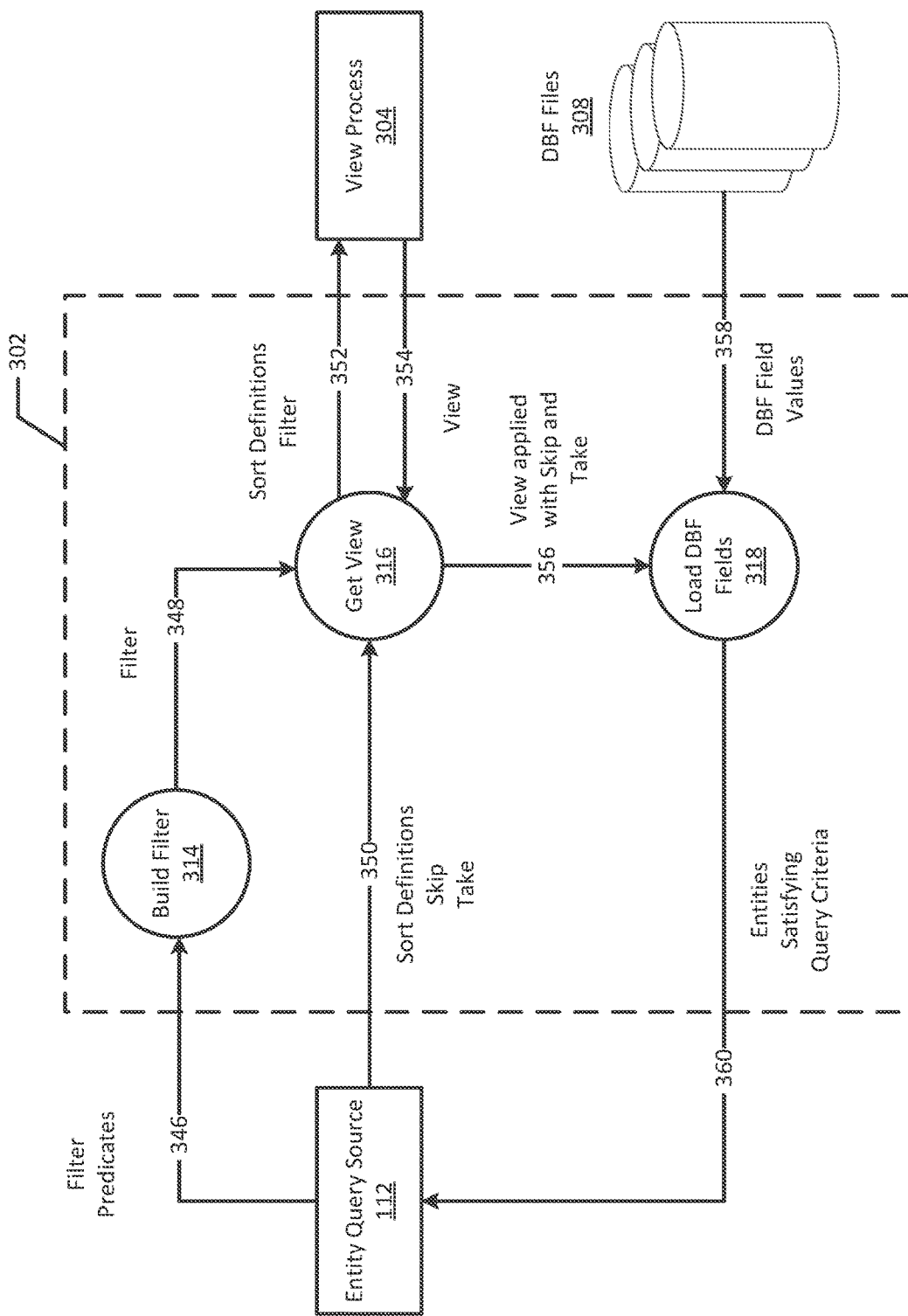
FIG. 3B illustrates an exemplary diagram of a DBF database entity query source process and component according to an embodiment.

FIG. 3B illustrates an exemplary embodiment of DBF entity query source process component 302 and a process performed thereby. The DBF entity query source process component 302 includes one or more sub-components. In the embodiment illustrated in FIG. 3B, the sub-components of DBF entity query source process component 302 include a build filter function 314, a get view process 316, and a load DBF fields process 318. The entity query source 112 provides, at 346, filter predicates to the build filter function 314. Once the filter is built by the build filter function 314, it is provided to the get view process 316 at 348. The entity query source 112 also provides, at 350, sort definitions (e.g., skip and take) to the get view process 316. The get view process 316 provides, at 352, sort definitions and a filter to view process 304, which generates the view and provides it to the get view process at 354. The view generated by view process 304 includes a sorted and filtered collection of entities containing referenced fields. The get view process 316 provides, at 356, the view applied with skip and take to the load DBF fields process 318. The load DBF fields process 318 retrieves DBF field values from DBF files 308 at 358. The load DBF fields process 318 provides entities satisfying the entity query criteria to entity query source 112 at 360.

Figure 3C:
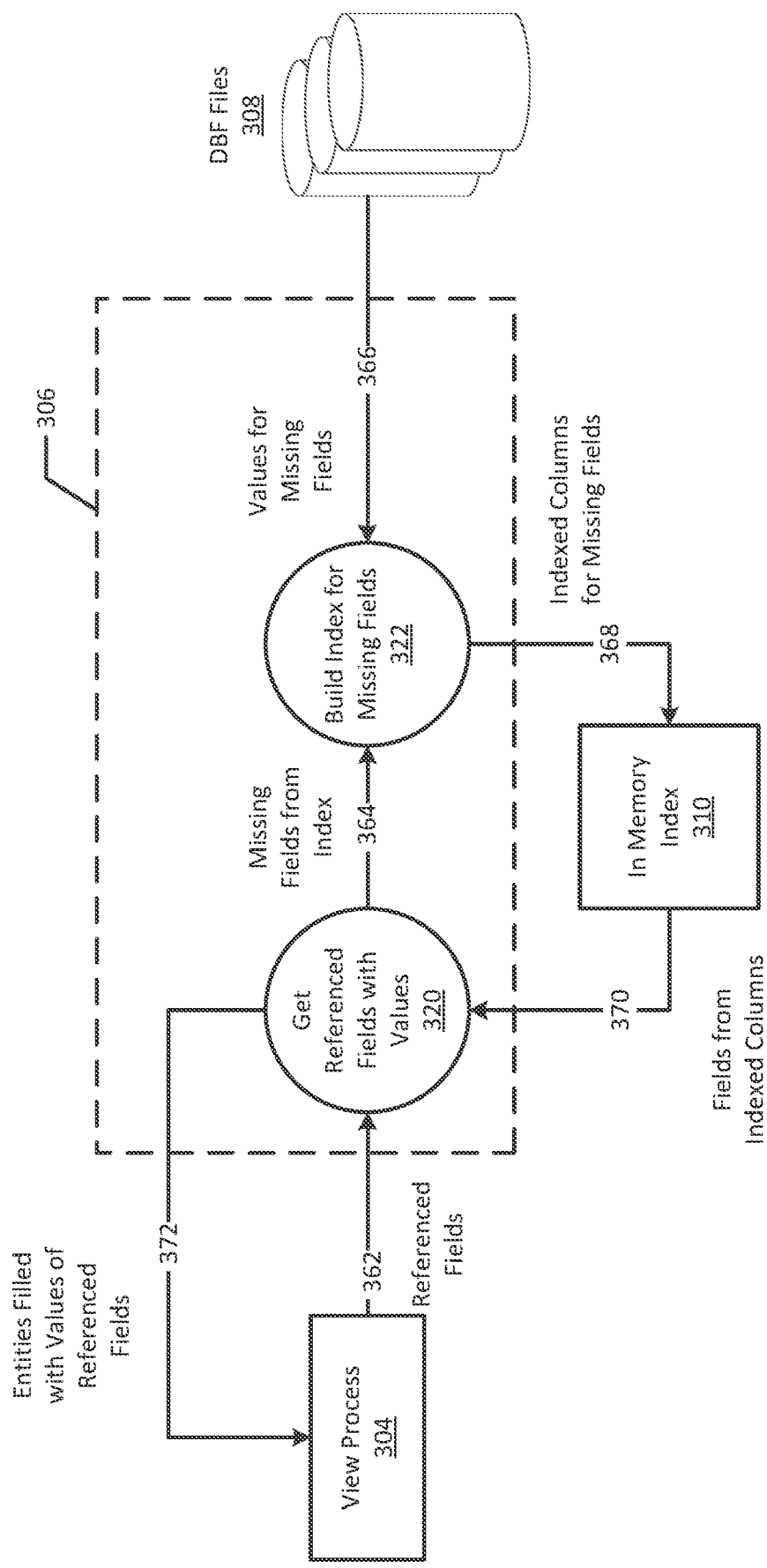
FIG. 3C illustrates an exemplary diagram of a data cache process and component according to an embodiment.

FIG. 3C illustrates an exemplary embodiment of data cache process component 306 and a process performed thereby. The data cache process component 306 includes one or more sub-components. In the embodiment illustrated in FIG. 3C, the sub-components of data cache process component 306 include a get referenced fields with values process 320 and a build index for missing fields process 322. The view process component 304 provides, at 362, referenced fields to the get referenced fields with values process 320. The get referenced fields with values process 320 provides, at 364, fields missing from the index to the build index for missing fields process 322. At 366, the build index for missing fields process 322 retrieves values for the missing fields from DBF files 308. The build index for missing fields process 322 provides, at 368, indexed columns for missing fields to the in-memory index 310. The in-memory index 310 provides, at 370, fields from indexed columns to the get referenced fields with values process 320. At 372, the get referenced fields with values process 320 provides entities that are filled with values of the referenced field to the view process component 304.

Figure 4A:
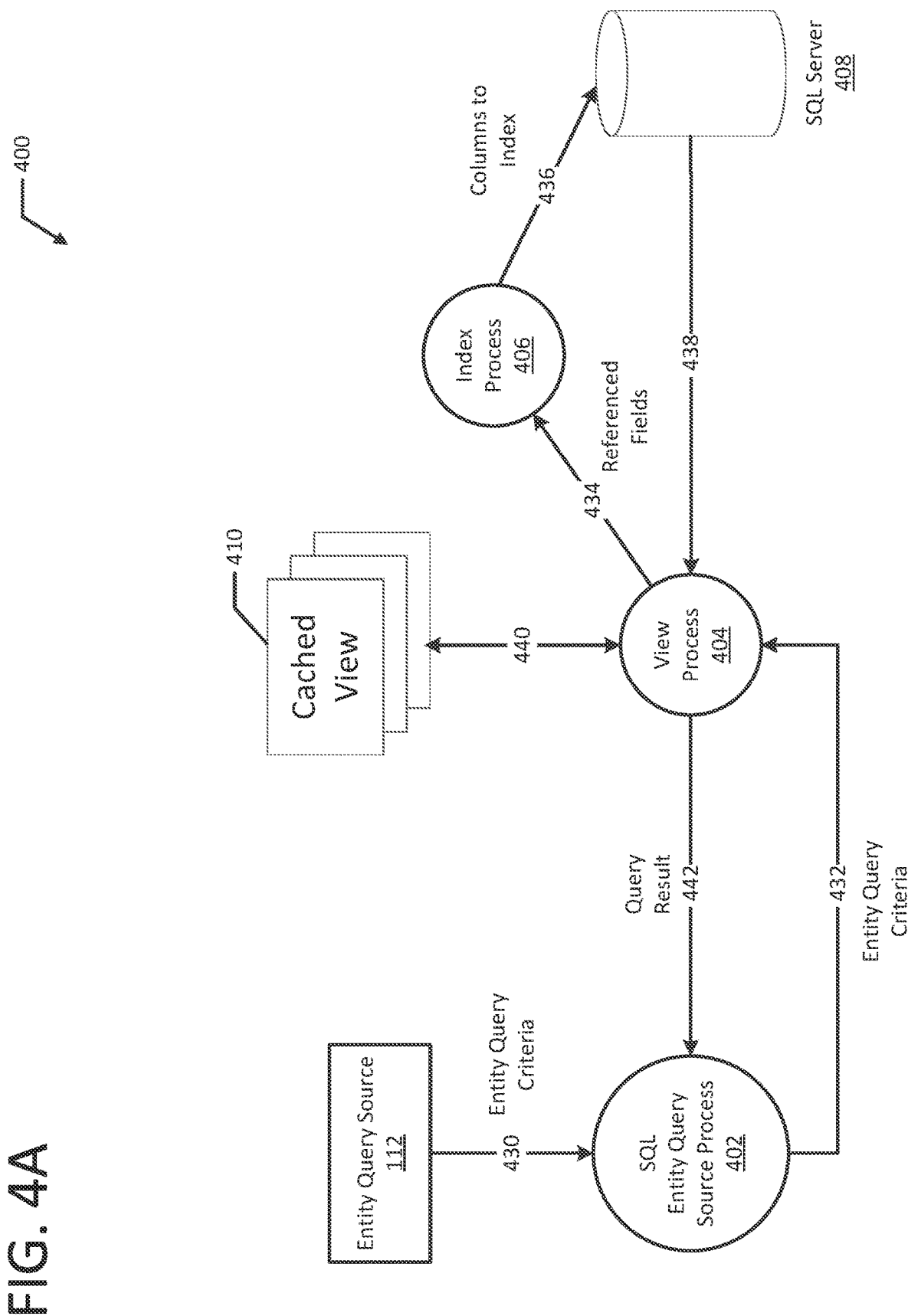
FIG. 4A illustrates an exemplary diagram of a query data source utilizing data storage in SQL-based databases according to an embodiment.

FIG. 4A illustrates an exemplary embodiment of a system and process utilizing an SQL server 408 as the storage, generally indicated at 400. The system includes entity query source 112, an SQL entity query source process component 402, a view process component 404, an index process component 406, an SQL server 408, and a cached view 410. The entity query source 112 provides, at 430, entity query criteria to the SQL entity query source process component 402, which in turn provides the criteria to the view process component 404. The view process component 404 provides an indication of the fields required for fulfilling the query (e.g., referenced fields) within the entity query criteria to the index process component 406, at 434. The index process component 406 provides, at 436, columns to index to the SQL server 408. At 438, entities that are filled with values of the referenced fields, as further described herein, are provided from the SQL server 408 to the view process component 404. The view process component 404 provides and retrieves, at 440, cached views 410 directly from the SQL database index on SQL server 408 by querying from the index. In the context of the embodiment of FIGS. 4A-4C, a view includes a graphical representation of query results from the SQL server 408. The view process component 404 then provides the query result, at 442, to the SQL entity query source process component 402.

Figure 4B:
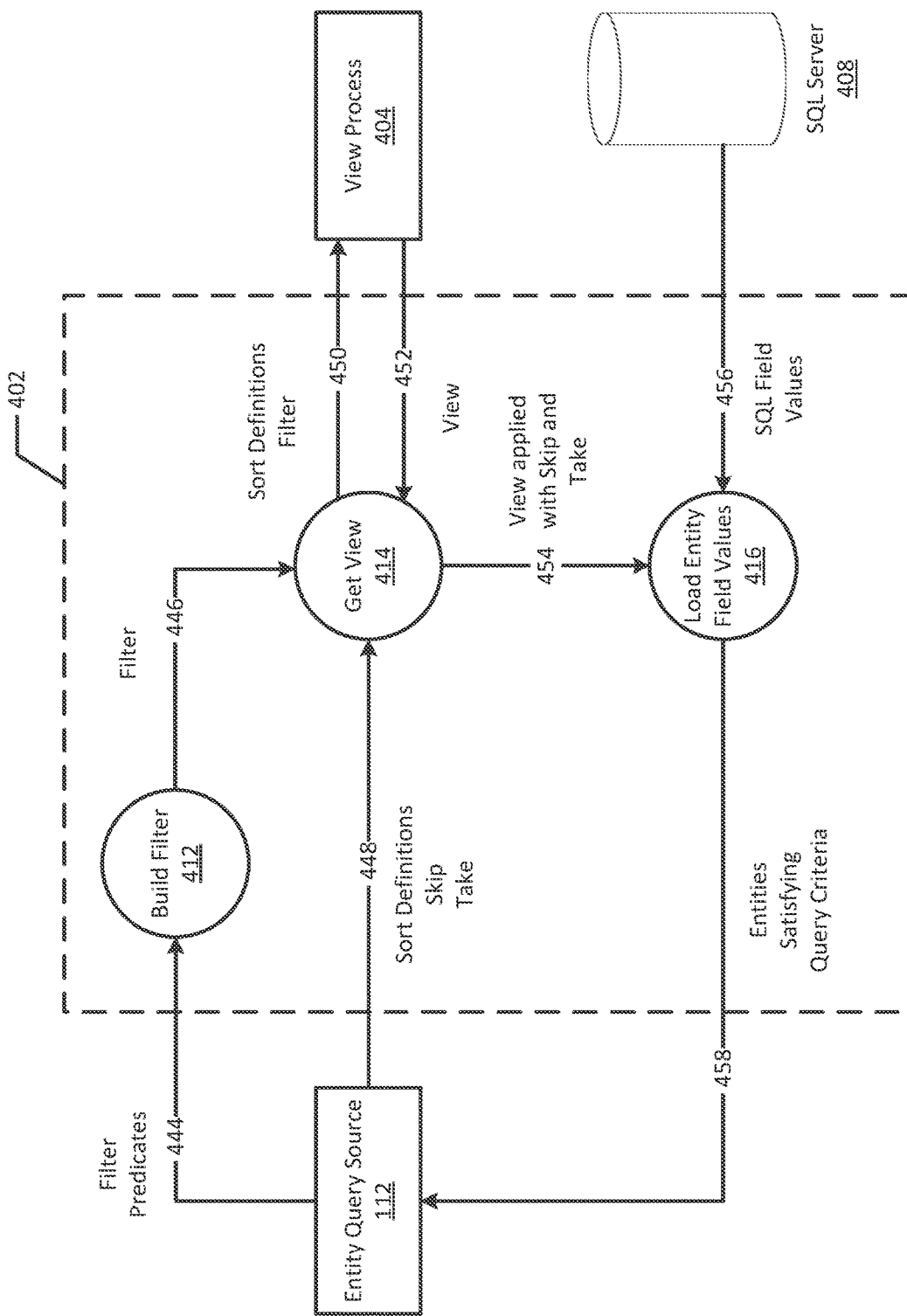
FIG. 4B illustrates an exemplary diagram of an SQL entity query source process and component according to an embodiment.

FIG. 4B illustrates an exemplary embodiment of SQL entity query source process component 402 and a process performed thereby. The SQL entity query source process component 402 includes one or more sub-components. In the embodiment illustrated in FIG. 4B, the sub-components of SQL entity query source process component 402 include a build filter function 412, a get view process 414, and a load entity field values process 416. The entity query source 112 provides, at 444, filter predicates to the build filter function 412. Once the filter is built by the build filter function 412, it is provided to the get view process 414 at 446. The entity query source 112 also provides, at 448, sort definitions (e.g., skip and take) to the get view process 414. The get view process 414 provides, at 450, sort definitions and a filter to view process component 404, which generates the view and provides it to the get view process at 452. The view generated by view process 404 includes a sorted and filtered collection of entities containing referenced fields. The get view process 414 provides, at 454, the view applied with skip and take to the load entity field values process 416. The load DBF fields process 416 retrieves SQL field values from SQL server 408 at 456. The load entity field values process 416 provides entities satisfying the entity query criteria to entity query source 112 at 458.

Figure 4C:
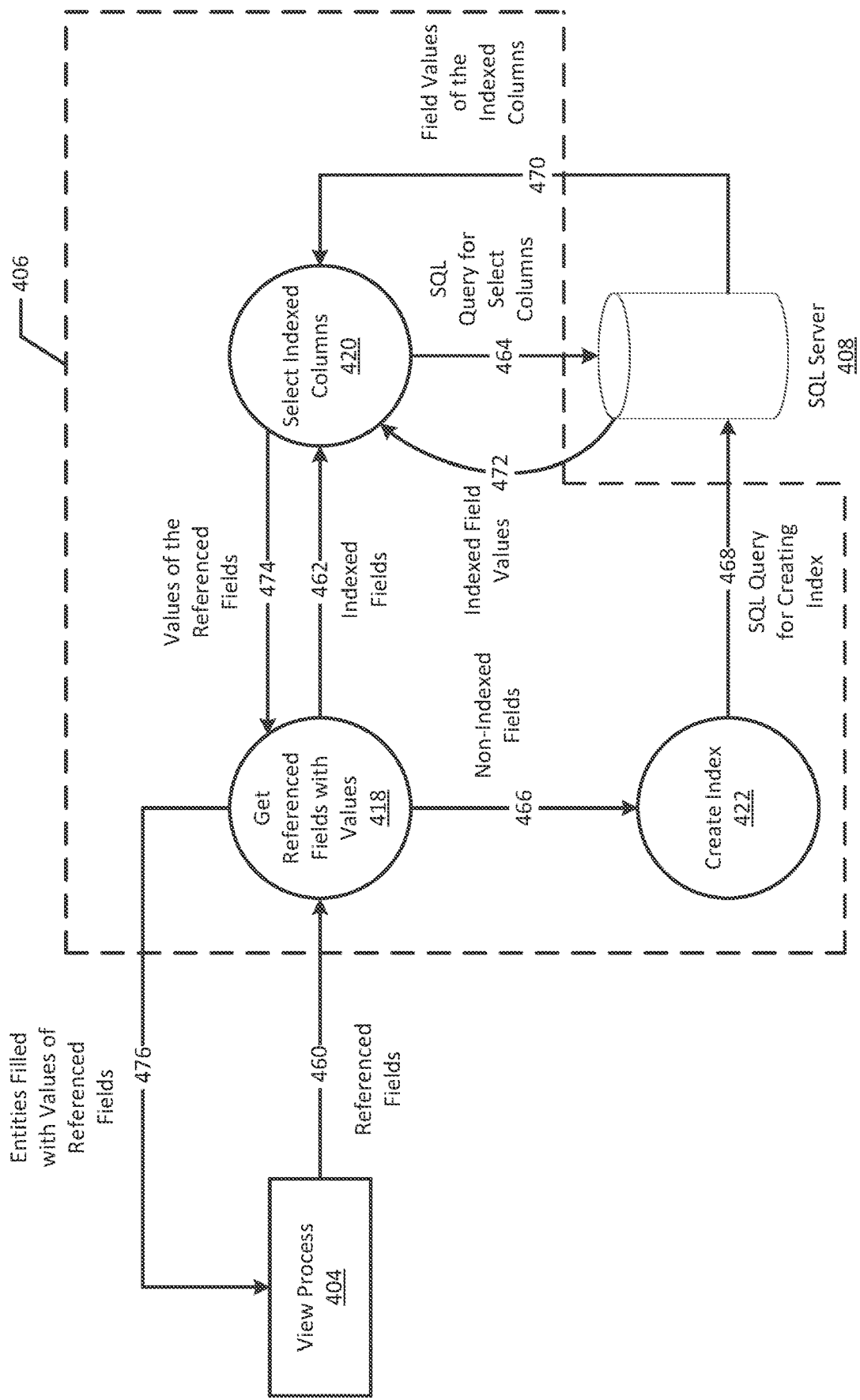
FIG. 4C illustrates an exemplary diagram of an index process and component according to an embodiment.

FIG. 4C illustrates an exemplary embodiment of index process component 406 and a process performed thereby. The index process component 406 includes one or more sub-components. In the embodiment illustrated in FIG. 4C, the sub-components of index process component 406 include a get referenced fields with values process 418, a select indexed columns process 420, and a create index process 422. The view process component 404 provides, at 460, referenced fields to the get referenced fields with values process 418. The get referenced fields with values process 418 provides, at 462, indexed fields to the select indexed columns process 420. The select indexed columns process 420 provides an SQL query for select columns to the SQL server 408, at 464. The get referenced fields with values process 418 also provides, at 466, non-indexed fields to the create index process 422. The create index process 422 provides, at 468, an SQL query for creating the index to the SQL server 408. The SQL server provides, at 470, field values of the indexed columns to the select indexed columns process 420. The SQL server also provides, at 472, indexed field values to the select indexed columns process 420. The select indexed columns process 420 provides, at 474, values of the referenced fields to the get referenced fields with values process 418. At 476, the get referenced fields with values process 418 provides entities filled with values of referenced fields to the view process component 404.

Figure 5:
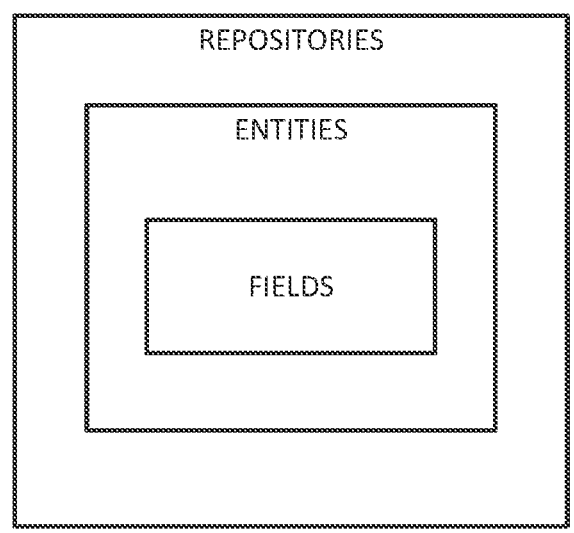
FIG. 5 illustrates an exemplary embodiment of a data model according to an embodiment.

FIG. 5 illustrates a data modeling format that includes repositories, entities, and fields, in accordance with an embodiment of the disclosure. In an embodiment, a data modeling component of entity query source 112 models data stored in data sources (e.g., DBF files 308, SQL server 408, etc.) in accordance with the data modeling format illustrated in FIG. 5.

Figure 6:
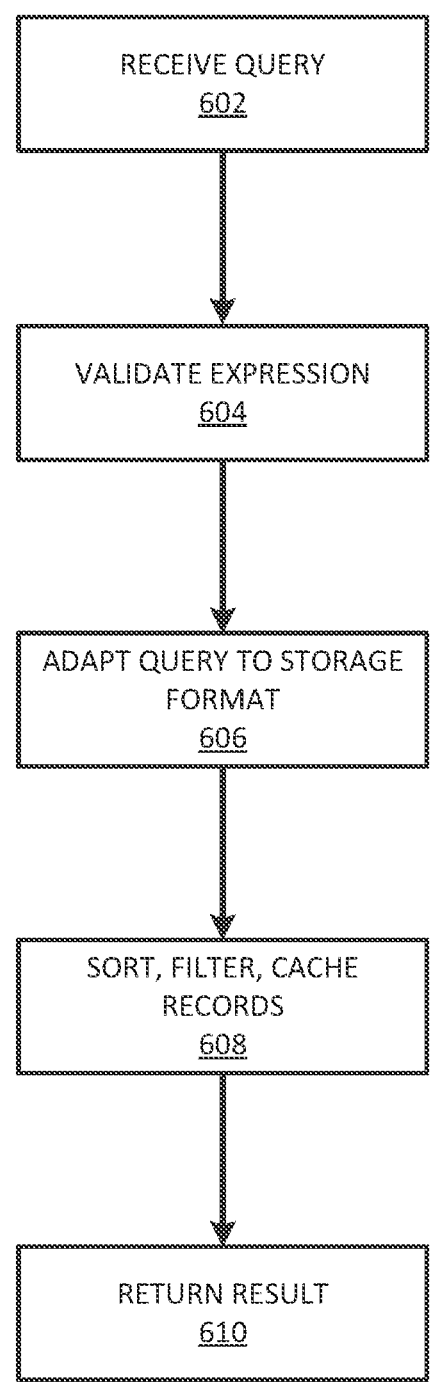
FIG. 6 illustrates an exemplary operation for adapting queries according to an embodiment.

FIG. 6 illustrates an exemplary operation of the systems of FIGS. 1 and 2, generally indicated at 600. At step 602, the queryable interface (e.g., parser 108) receives a query via the programmatic interface (e.g., caller 104). At step 604, the queryable interface (e.g., parser 108) validates the query (e.g., LINQ statements). In an embodiment, the queryable interface allows built-in numeric and string types, generic collection types, and SCADA system built-in types and their methods to ensure that the query does not contain foreign types that are not recognizable by the service when the query is written and compiled from a remote proxy (e.g., proxy 206).

At step 606, the queryable interface (e.g., entity query source 112) adapts the LINQ query statements into the conditions of the formats of databases (e.g., DBF files 308, SQL server 408, etc.). In an embodiment, the expressions in Where, OrderyBy, and Skip/Take are converted into filter, sort, and virtualizing conditions, respectively. The queryable interface (e.g., entity query source 112) also identifies keywords, such as field names, at this stage for the purpose of optimization. At step 608, the databases (e.g., DBF files 308, SQL server 408, etc.) sort, filter, and/or cache data records therein and return the results to the programmatic interface (e.g., caller 104) at step 610.

An exemplary software instruction for validating LINQ query statements and adapting the LINQ query statements into the conditions of particular database formats is:
   System.CreateQuery("Variable", out variableQuery);
   var Prefix1Tags=variableQuery.Where(e=>
   e["NAME"].Value.ToString( ).StartWith("Prefix1"))
   .OrderBy(e=>e["TYPE"])
   .Select(e=>e["NAME"])
   .Skip(200).Take(25)
   .ToList( );
In this example, "NAME" and "TYPE" keywords are identified and those two fields are cached for the purpose of sorting and filtering. The result is a collection of the names of the variable tags whose names start with "Prefix1" and sorted by their types, skip 200 and take the next 25. Those variable tags could come from any of the variable.dbf stores among the projects in the system.

In an embodiment, aspects of the database query process 100 beneficially virtualize data to permit developers to focus on business logic (e.g., Citect user configuration) while working with large user projects. For example, a developer may provide the command "create queryable object" without needing to know the details behind creating of the object. Additional aspects of the database query process 100 (e.g., entity query source 112) adapt queries from a common interface into conditions specific to particular database formats so that a single query can act on multiple database stores. Further aspects of the database query process 100 (e.g., cached views 312, 410, etc.) store values indicating the fields required for fulfilling the query to optimize memory usage by not having to load all the data in memory in order to execute the query.

Figure 7:
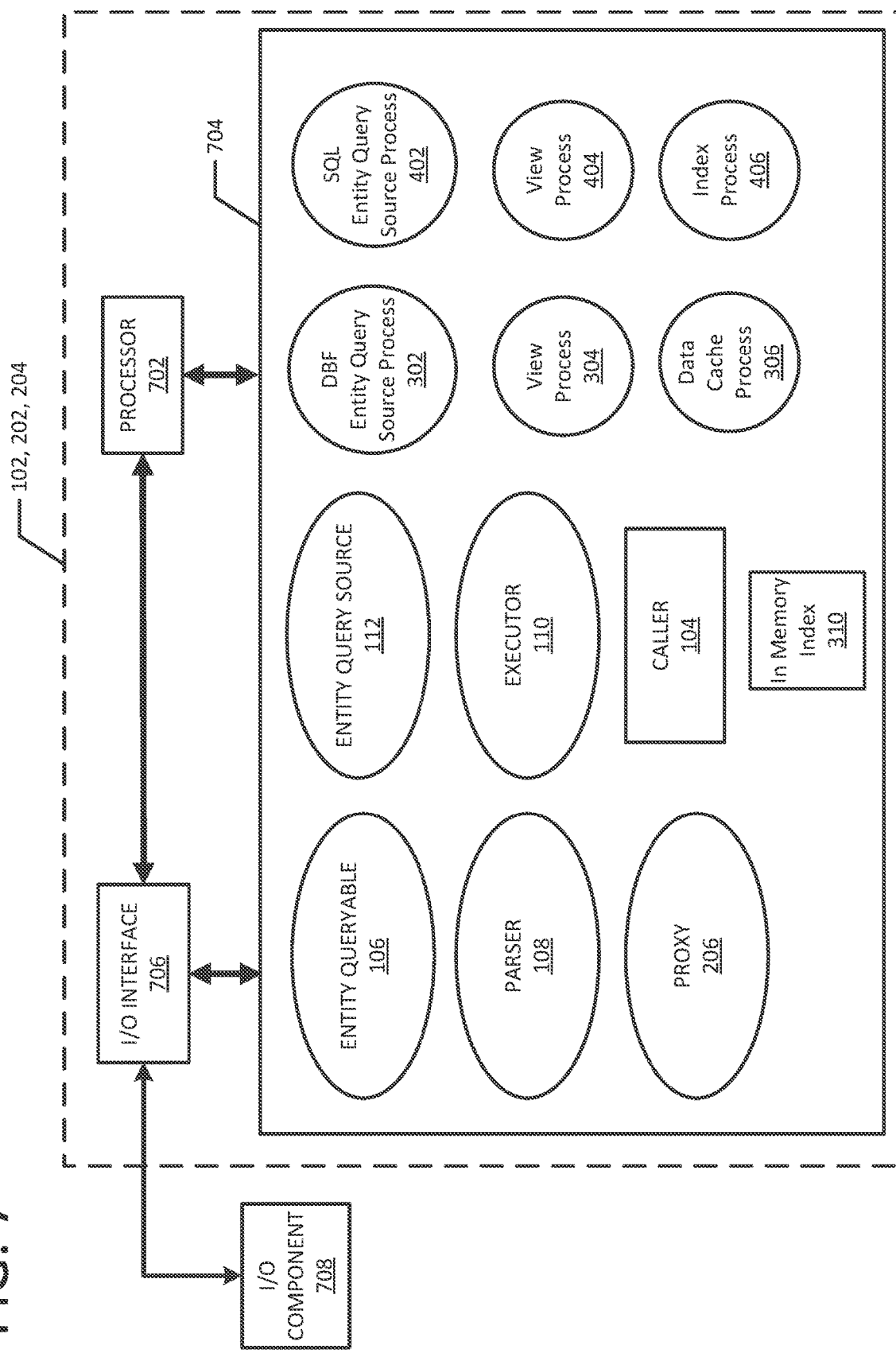
FIG. 7 illustrates an exemplary computing device architecture within which aspects of the disclosure may be implemented according to an embodiment.

FIG. 7 illustrates an exemplary architecture of a computing device (e.g., computing device 102, first computing device 202, second computing device 204) programmed to provide aspects of the systems and processes described herein via a software environment. In this embodiment, the computing device includes a processor 702, a memory 704, and an input/output (I/O) interface 706 that interfaces with an I/O component 708. The memory 704 includes caller 104, entity queryable 106, parser 108, executor 110, entity query source 112, proxy 206, DBF entity query source process component 302, view process component 304, data cache process component 304, SQL entity query source process 402, view process component 404, and index process component 406 each embodied in processor-executable instructions for executing by processor 702. In this manner, the computing device comprises a special-purpose computing device for adapting database queries for data virtualization over combined database stores.

The processor 702, memory 704, and I/O interface 706 are communicatively connected and/or electrically connected to each other. The I/O interface 706 is communicatively and/or electrically connected to the I/O component 708. The processor 702 is adapted to execute processor-executable instructions stored in the memory 704 for implementing the database query adaptation and virtualization system and process in real time. The I/O interface 706 of FIG. 7 provides a physical data connection between the computing device and I/O component 708. In an embodiment, I/O interface 706 is a network interface card (NIC) or modem and I/O component 708 is a telecommunications network (e.g., communications network 208).

In an embodiment, a system in accordance with an aspect of the disclosure includes a first computing device (e.g., computing device 202), a communications network (e.g., communications network 208), and a second computing device (e.g., computing device 204). The first computing device includes an interface processor (e.g., processor 702) and a memory device (e.g., memory 704) communicatively coupled to the interface processor. The memory device stores processor readable instructions that, when executed by the interface processor, provide a query-based programmatic interface (e.g., caller 104) and a proxy (e.g., proxy 206). The query-based programmatic interface is configured to receive (602) database queries. The parser is configured to validate (604) the received queries and produce (124) entity query criteria from the validated queries. The second computing device is communicatively coupled to the first computing device via the communications network. The second computing device includes a query processor (e.g., processor 702) and a memory device (e.g., memory 704) communicatively coupled to the query processor. The memory device stores processor readable instructions that, when executed by the query processor, provide an entity query source (e.g., entity query source 112). The entity query source is configured to adapt (606) the entity query criteria into one or more conditions of a plurality of data sources (e.g., DBF files 308, SQL server 408, etc.) such that the data sources filter and sort data stored therein to determine query results satisfying the database queries. The entity query source is further configured to return (130, 610) the query results for display via the query-based programmatic interface. In an aspect, the memory device of the second computing device stores processor readable instructions that, when executed by the query processor, further provide an executor (e.g., executor 110). The executor is configured to receive the entity query criteria from the proxy via the communications network and invoke (128) corresponding methods of the entity query source.

In another embodiment, a method for querying data across combined data stores in accordance with an aspect of the disclosure includes receiving (602) a database query via a query-based programmatic interface (e.g., caller 104). A parser (e.g., parser 108) validates (604) the received query and produces (124) entity query criteria from the validated query. The method further includes an entity query source (e.g., entity query source 112) adapting (606) the entity query criteria into conditions of a proprietary database format such that a database (e.g., DBF files 308, SQL server 408, etc.) of the proprietary database format filters and sorts data stored therein to determine query results satisfying the database query. The method further includes displaying (610) the query results via the query-based programmatic interface.

In yet another embodiment, a computer readable storage device (e.g., memory 704) has processor readable instructions stored thereon including instructions that, when executed by a processor (e.g., processor 702), provide a database query platform. The platform includes a query-based programmatic interface (e.g., caller 104), a parser (e.g., parser 108), an executor (e.g., executor 110), and an entity query source (e.g., entity query source 112). The query-based programmatic interface is configured to receive database queries. The parser is configured to validate the received queries and produce entity query criteria from the validated queries. The executor is configured to receive the entity query criteria from the parser and invoke one or more corresponding methods in an entity query source. The entity query source is configured to perform the corresponding methods to adapt the entity query criteria into one or more conditions of a plurality of data sources such that the data sources filter and sort data stored therein to determine query results satisfying the database queries represented by the entity query criteria and return the query results for display via the query-based programmatic interface.

In addition to the embodiment described above with respect to FIG. 7, embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
  a first computing device, comprising: an interface processor, and
    a first non-transitory memory device communicatively coupled to the interface processor, the first non-transitory memory device storing processor readable instructions thereon that, when executed by the interface processor, provide:
      a query-based programmatic interface configured to receive database queries, and
      a proxy configured to validate the received database queries and produce entity query criteria from the validated received database queries;
  a communications network; and
  a second computing device communicatively coupled to the first computing device via the communications network, the second computing device comprising:
    a query processor, and
    a second non-transitory memory device communicatively coupled to the query processor, the second non-transitory memory device storing processor readable instructions thereon that, when executed by the query processor, provide an entity query source configured to adapt the entity query criteria into one or more conditions of a plurality of data sources such that the plurality of data sources filter and sort data stored therein to determine query results satisfying the database queries and return the query results for display via the query-based programmatic interface;
  wherein the entity query criteria comprise at least two of:
    a referenced fields parameter indicating fields required for fulfilling the database queries;
    a filter predicate parameter operating on an entity and returning whether the entity satisfies a filter condition;
    a sort definitions parameter indicating a sort order;
    a selected field parameter indicating a field to select; and
    a skip and take parameter indicating how many entities to skip and how many entities to take.

2. The system of claim 1, wherein the received database queries comprise Language-Integrated Query (LINQ) statements and the entity query source comprises:
  an adapter component configured to adapt the LINQ statements of the received database queries into the one or more conditions;
  a data modeling component configured to model data stored in the plurality of data sources;
  an action details component configured to implement details for reading data from the plurality of data sources and writing data to the plurality of data sources;
  an optimization algorithm configured to optimize assignment of the received database queries to the plurality of data sources; and
  a memory saving component configured to reduce utilization of computing memory of the system.

3. The system of claim 1, wherein the entity query source is further configured to implement a function that retrieves, from the plurality of data sources, all entities that satisfy the entity query criteria.

4. The system of claim 1, wherein the entity query source is further configured to implement a function that retrieves, from the plurality of data sources, field values of all entities that satisfy the entity query criteria.

5. The system of claim 1, wherein the entity query source is further configured to implement a function that retrieves, from the plurality of data sources, a count of all entities that satisfy the entity query criteria.

6. The system of claim 1, wherein the second non-transitory memory device of the second computing device stores processor readable instructions thereon that, when executed by the query processor, further provide an executor configured to receive the entity query criteria from the proxy via the communications network and invoke corresponding methods of the entity query source.

7. A computer-implemented method for querying data across combined data stores comprising:
    receiving a database query via a query-based programmatic interface;
    validating, by a parser, the received query;
    producing, by the parser, entity query criteria from the validated query; adapting, by an entity query source, the entity query criteria into conditions of a proprietary database format such that a database of the proprietary database format filters and sorts data stored therein to determine query results satisfying the database query; and
    displaying the query results via the query-based programmatic interface;
    wherein the entity query criteria comprise at least two of:
        a referenced fields parameter indicating fields required for fulfilling the database queries;
        a filter predicate parameter operating on an entity and returning whether the entity satisfies a filter condition;
        a sort definitions parameter indicating a sort order;
        a selected field parameter indicating a field to select; and
        a skip and take parameter indicating how many entities to skip and how many entities to take.

8. The method of claim 7, wherein said adapting further comprises:
    adapting, by an adapter component, Language-Integrated Query (LINQ) statements of the received query into the conditions;
    modeling, by a data modeling component, the data stored in the databases;
    implementing details, by an action details component, for reading data from the database and writing data to the database;
    optimizing, by an optimization algorithm, assignment of the received query to the database; and
    reducing, by a memory saving component, utilization of computing memory during said adapting and displaying.

9. The method of claim 7, further comprising implementing, by the entity query source, a function that retrieves, from the database, all entities that satisfy the entity query criteria.

10. The method of claim 7, further comprising implementing, by the entity query source, a function that retrieves, from the database, field values of all entities that satisfy the entity query criteria.

11. The method of claim 7, further comprising implementing, by the entity query source, a function that retrieves, from the database, a count of all entities that satisfy the entity query criteria.

12. The method of claim 7, further comprising:
    receiving, by an executor, the entity query criteria from the parser; and
    invoking, by the executor, corresponding methods of the entity query source.

13. A non-transitory computer readable storage device having processor readable instructions stored thereon including instructions that, when executed by a processor, provide a database query platform, comprising:
    a query-based programmatic interface configured to receive database queries;
    a parser configured to validate the received database queries and produce entity query criteria from the validated received database queries;
    an executor configured to receive the entity query criteria from the parser and invoke one or more corresponding methods in an entity query source; and
    the entity query source, wherein the entity query source is configured to perform the one or more corresponding methods to adapt the entity query criteria into one or more conditions of a plurality of data sources such that the plurality of data sources filter and sort data stored therein to determine query results satisfying the received database queries represented by the entity query criteria and return the query results for display via the query-based programmatic interface;
    wherein the entity query criteria comprise at least two of:
        a referenced fields parameter indicating fields required for fulfilling the database queries;
        a filter predicate parameter operating on an entity and returning whether the entity satisfies a filter condition;
        a sort definitions parameter indicating a sort order;
        a selected field parameter indicating a field to select; and
        a skip and take parameter indicating how many entities to skip and how many entities to take.

14. The non-transitory computer readable storage device of claim 13, wherein the entity query source comprises:
    an adapter component configured to adapt Language-Integrated Query (LINQ) statements of the received database queries into the one or more conditions;
    a data modeling component configured to model data stored in the plurality of data sources; an action details component configured to implement details for reading data from the plurality of data sources and writing data to the plurality of data sources;
    an optimization algorithm configured to optimize assignment of the received database queries to the data sources; and
    a memory saving component configured to reduce utilization of computing memory.

15. The non-transitory computer readable storage device of claim 13, wherein the entity query source is further configured to implement a function that retrieves, from the plurality of data sources, all entities that satisfy the entity query criteria.

16. The non-transitory computer readable storage device of claim 13, wherein the entity query source is further configured to implement a function that retrieves, from the plurality of data sources, field values of all entities that satisfy the entity query criteria.

17. The non-transitory computer readable storage device of claim 13, wherein the entity query source is further configured to implement a function that retrieves, from the plurality of data sources, a count of all entities that satisfy the entity query criteria.

* * * * *